Jan. 25, 1938. H. H. LANNING 2,106,219
SPRING ASSEMBLY
Filed June 17, 1935
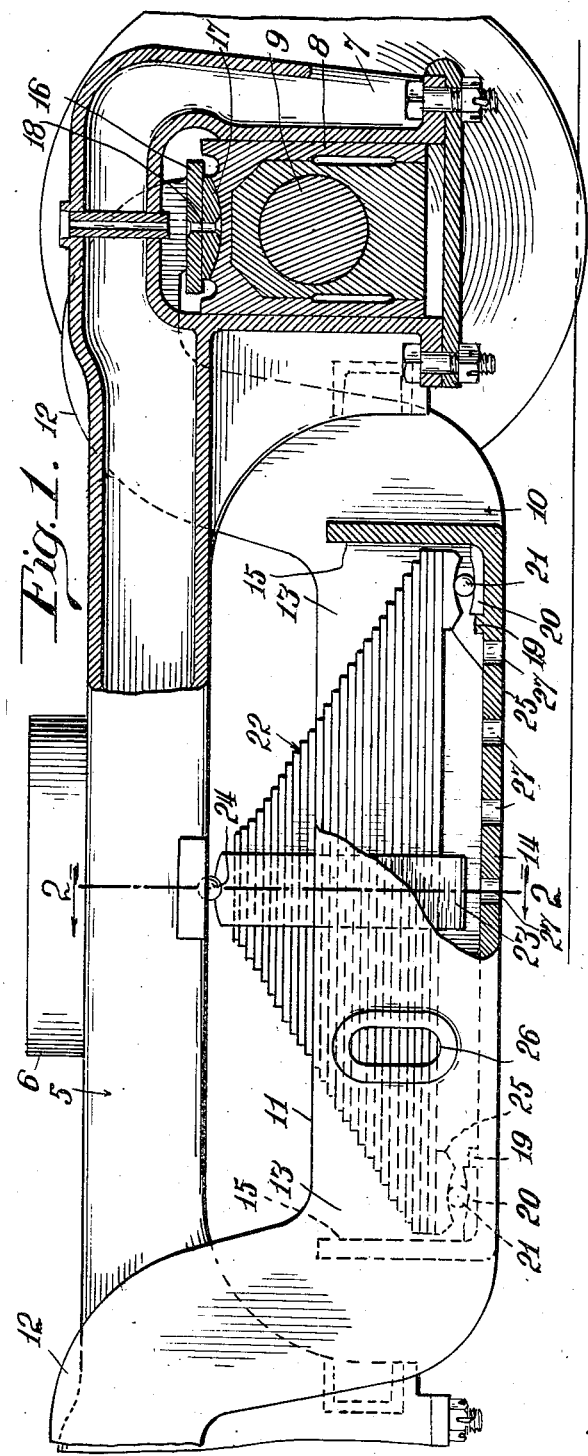
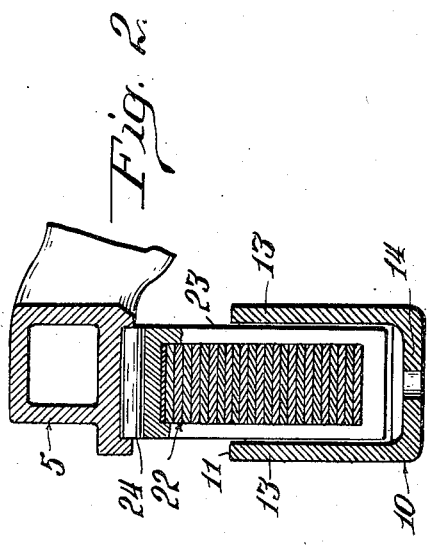
Inventor
Howard H. Lanning,
By
Attorney Patented Jan. 25, 1938

2,106,219

UNITED STATES PATENT OFFICE 2,106,219

SPRING ASSEMBLY

Howard H. Lanning, Topeka, Kans., assignor to General Steel Castings Corporation, Eddystone, Pa., a corporation of Delaware Application June 17, 1935, Serial No. 27,036

1 Claim. (Cl. 105—194)

My invention relates to a spring assembly more especially adapted for the trucks of a locomotive and of railway vehicles, whereby means are provided for distributing a proper proportion of the truck-borne load to each axle bearing of the truck.

The invention involves a single piece equalizer element whereby the load is yieldingly transmitted to the tops of the journal-boxes of the truck in vertical alignment with the axle bearings, through the medium of a floating or loosely associated arcuate wear resisting means; the ends of the equalizer element and said means being formed to permit proper introduction of lubricant to the lower arcuate surface of said means.

The invention also contemplates an equalizer element whose intermediate portion is formed to provide a closed ended continuous channel for receiving the bottom members of a plate spring, with means in said channel whereby proper flexing and free movement of the spring is permitted in accommodating itself to load variations; said semi-elliptic or plate spring being adapted to have the truck side frame fulcrumed thereon.

The objects and advantages of my invention will all be readily comprehended from the following detailed description of the accompanying drawing, wherein—

Figure 1 is a partial side elevation and sectional view of a portion of a truck frame, with one end broken away and illustrating my improved spring assembly.

Figure 2 is a vertical section taken substantially on the line 2—2 of Figure 1.

For purposes of exemplification, I have chosen to illustrate my invention as it would be applied to a four-wheel truck of the inboard type, but it is apparent that it may be readily applied to other types of trucks; and it will also be understood that the construction of the mechanism and its relation to the journal-box at the opposite end not shown is identically like that disclosed.

In the specific embodiment, the truck frame is shown at 5, provided with a center plate at 6 which is adapted to receive a suitable male center plate, whereby the body of the locomotive or vehicle is normally supported by the center plate 6 of the truck frame. The male center plate (not shown) secured to the body and the truck center plate 6 are formed to provide a broad contact, by their flat surfaces, which serves to hold the truck center plate and the truck frame in substantially parallel relation to the body center plate and to the body or underframe of the locomotive or vehicle and thus maintains the truck frame in a substantially horizontal position with reference to the track.

The ends of the side frame of the truck terminate in the pedestal portions or jaws 7 in which the journal-boxes 8 are slidingly fitted so as to be free to move vertically.

The means employed for yieldingly transmitting the superposed load on the truck frame 5 to the journals or axles 9, through the medium of the usual journal bearings located in the journal-boxes, involves an equalizer member 10 having an intermediate horizontal portion 11 and the upwardly and laterally or outwardly disposed or curved ends 12, 12 which are adapted to be supported by the tops of the journal-boxes 8. The intermediate horizontally disposed body portion 11 is of channel formation consisting of the parallelly arranged side walls 13, 13, and the transverse bottom wall 14, see Figure 2; the transverse or bottom wall 14, coincident with the upwardly disposed portions 12, is arranged to extend vertically as shown at 15, thus providing an elongated box-like pocket or chamber.

The upwardly disposed portions 12 of the member 10 beyond the vertical portions 15 of the transverse wall 14 are unconnected with each other except at the distal ends where they are united by a tie web or flat bearing plate 16 which is intended to have flat bearing contact with a preferably circular member or disc 17 provided with a lower convexed surface conforming with a concaved seat formed in the top of the journal-box above the journal bearing in the box; the disc 17 being preferably of bronze or other antifriction metal. With this floating or free moving arcuate bearing the load will be at all times centered substantially at the vertical center line of the journal bearing irrespective of the various positions which the bearing may assume as the wheels pass over irregularities in the track.

The tie web 16 and the bearing disc 17 are shown provided with aligned lubricant introducing holes at 18, preferably provided with flared orifices as shown.

With the upwardly disposed portions 12 unconnected as mentioned, passage of the truck frame is provided and free movement of the equalizer member independent of the truck frame is permitted.

The bottom wall 14 at each end of the box-like chamber, and at a predetermined distance from the upstanding wall portion 15, is provided with an upstanding transversely disposed rib 19. Removably seated between the rib 19 and the adjacent upstanding wall portion 15 is a bearing plate or block 20 of hard wear-resisting material whose upper face is slightly dished as shown to receive a roller 21.

The elongated chamber in the horizontal portion 11 of the equalizer member 10 receives the spring 22 in the bottom of the chamber. This spring is composed of a plurality of leaves or plates of gradually decreasing length from the bottom to the top of the superposed or "nested" plates; and these plates are held together in juxtaposed relation by the encircling band 23.

The upper surface of the band 23 is preferably arched transversely and at the vertical median line is socketed to receive the fulcrum providing pin 24 which is shown preferably welded or otherwise immovably secured to the lower surface of the truck frame 5.

The lowermost plate of the composite spring 22 on its lower face and at each end is provided with a bearing plate or block 25 whose lower face is slightly dished like bearing block 20 and rests on the roller 21.

With these bearing blocks 20, 25 and the roller 21 arranged at each end of the lowermost plate of the composite spring 22, the latter is held in spaced relation with the bottom wall 14 of the chamber, thus providing ample play below the bottom of the band 23 for downward flexing of the spring plates; while at the same time free movement of the spring 22 in accommodating itself to variations in load is permitted.

In order that proper inspection may be made of the respective leaves or plates of the spring which are located in the chamber, the outside side wall 13 is provided with a pair of elongated inspection holes 26.

As is apparent from the construction, the weight of the truck frame and its superposed load is applied through the medium of fulcrum 24 and band 23 to the composite spring 22, which in turn yieldingly transmits it through the floating bearings 25—21—20 to the equalizer member 10, which in turn transmits it to the journal-bearings through the medium of the arcuate bearing plate 17; the equalizer 10 being free to oscillate vertically about pivot 24. This permits the ends of the equalizer to rise and fall freely with the upward and downward movements of the journal-boxes produced when the wheels pass over humps and depressions in the track.

At the same time it will be noted that an equal distribution of load to all of the wheels is obtained; while any predetermined unequal distribution of load between front and back wheels of the truck can be obtained by a suitable off-center location of the fulcrum point 24 and spring band.

As shown in Figure 2, the width of the chamber formed in the equalizer member 10 is such that slight play will be provided between the spring band 23 and the side walls 13, 13 of the chamber in order that the band and spring leaves or plates may have free movement.

The bottom 14 of the channel or chamber of the equalizer element is preferably provided with a suitable number of holes as shown at 27 in order that water or dirt entering at the top of the chamber may readily drain therefrom.

The construction disclosed is believed to be the best embodiment of my invention but modifications may be made without, however, departing from the spirit of my invention.

What I claim is:

A spring assembly for locomotive trucks comprising a single piece equalizer bar having spaced apart side walls united intermediate of the ends to provide an elongated open top chamber having ends and side walls and provided with inspection and drain openings in said side and bottom walls, while the side walls at the ends of the equalizer bar are united by a transverse tie plate provided with an arcuate journal box top bearing portion, a dished bearing block removably seated in each end of said chamber; a spring in said chamber composed of superposed flat plates secured together intermediate of the ends by an encircling band the top whereof is formed to constitute a fulcrum point for the frame member of the truck; and a roller at each end of said chamber for supporting the spring plates.

HOWARD H. LANNING.